United States Patent [19]

Brown

[11] Patent Number: 4,506,761

[45] Date of Patent: Mar. 26, 1985

[54] SAWHORSE FRAME WITH STRONG CLAMPING ACTION AND COMPACT FOLDING FEATURE

[76] Inventor: James M. Brown, 12031 Lopez Canyon Rd., San Fernando, Calif. 91342

[21] Appl. No.: 479,753

[22] Filed: Mar. 28, 1983

[51] Int. Cl.³ ............................................. F16M 11/00
[52] U.S. Cl. ...................... 182/186; 182/226
[58] Field of Search ................. 182/153, 181–186, 182/226

[56] References Cited

U.S. PATENT DOCUMENTS

| | | | |
|---|---|---|---|
| 381,510 | 4/1888 | Rush | 182/186 |
| 2,136,420 | 11/1938 | Edwards | 182/226 |
| 2,261,217 | 11/1941 | Bond | 182/226 |
| 2,555,503 | 6/1951 | Morton | 182/226 |
| 2,648,761 | 8/1953 | Shamel | 182/153 |
| 2,793,003 | 5/1957 | Borchers | 182/186 |
| 2,882,021 | 4/1959 | Dreher | 182/153 |

Primary Examiner—Reinaldo P. Machado

Attorney, Agent, or Firm—Romney Golant Martin & Ashen

[57] ABSTRACT

A sawhorse frame is provided for use with a separate work-supporting top member that may be disposable. The frame is made with the paired legs at each end hinged together near their tops, and with pincer-like clamping jaws formed near the hinge points so that the work-supporting top member is very forcefully clamped in place. Force for this clamping is derived from the force with which the feet of the sawhorse are pressed against the floor, acting through a large mechanical advantage that arises from the foot-to-hinge distance's greatly exceeding the clamping-jaw-to-hinge distance. When the sawhorse frame is not in use, the same hinge arrangement facilitates folding the bottoms of the legs together to a more compact configuration for storage.

Cross members that connect together the paired legs at the remote ends of the sawhorse are dimensioned and disposed to avoid their touching the work-supporting top member, so that the latter may serve even though it be a warped or otherwise irregular piece of lumber or other stock.

8 Claims, 8 Drawing Figures

U.S. Patent     Mar. 26, 1985     4,506,761
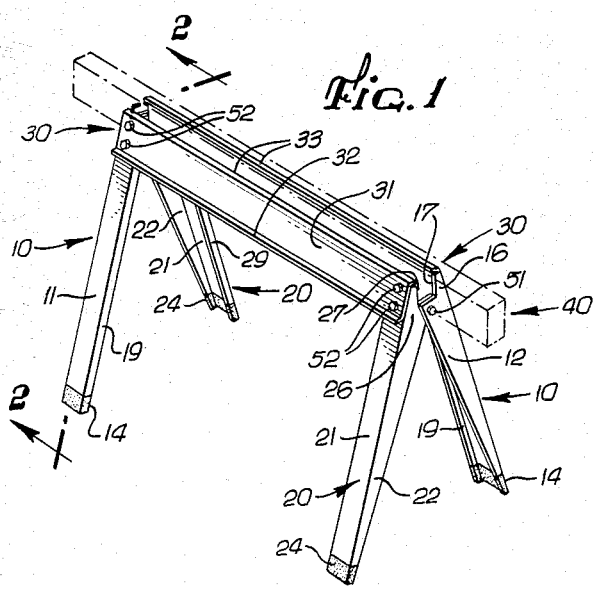
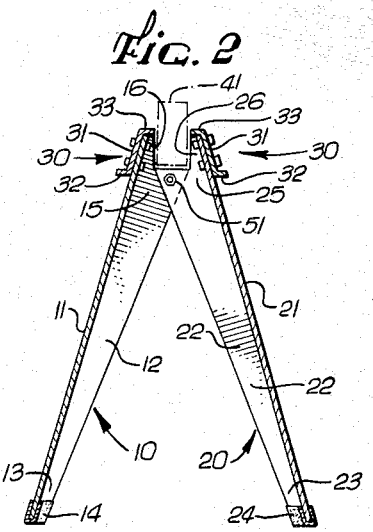
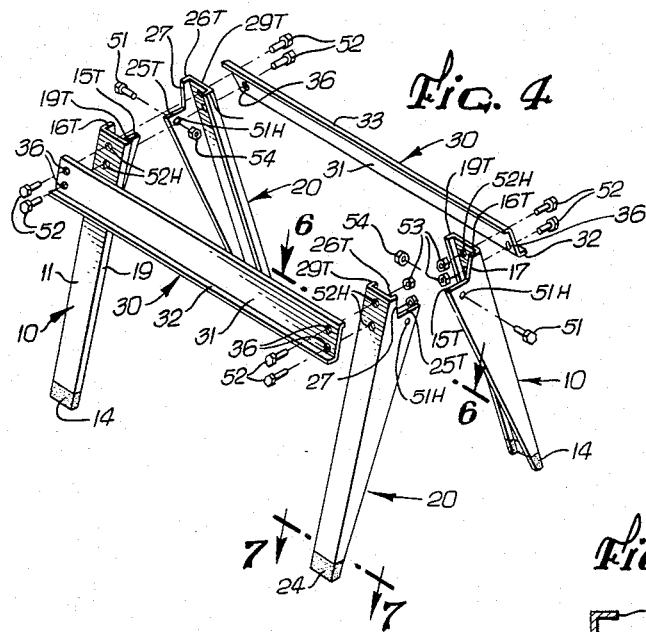
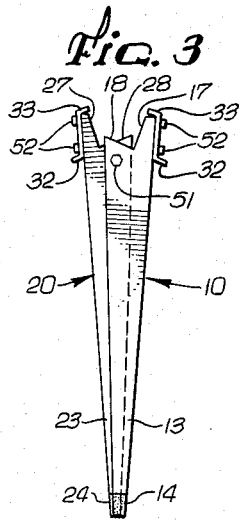
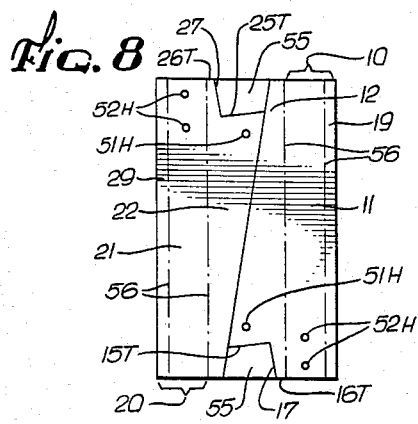
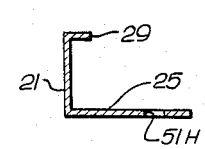
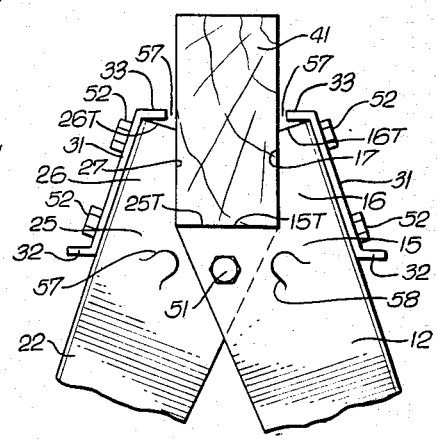

SAWHORSE FRAME WITH STRONG CLAMPING ACTION AND COMPACT FOLDING FEATURE

BACKGROUND

1. Field of the Invention

This invention relates generally to sawhorses for supporting carpentry and like work in progress at a convenient level for cutting, etc., and more particularly to a folding sawhorse frame for use with a disposable top member that actually supports the work.

It is not required that the top member in fact be disposable, but the invention is in the field of frames that permit use of an inexpensive piece of lumber or other stock for the top member; and in particular the top member may be somewhat warped or otherwise irregular and yet serve the purpose.

2. Prior Art

Earlier sawhorses have for the most part been made of wood, nailed together.

Some barricades have been made in generally sawhorse-style configuration, constructed partially or entirely of metal, with a hinge pin at each end near the top. Generally these prior sawhorses have a "built-in" or integrally incorporated work-supporting top member that is a permanent part of the sawhorse structure.

Nailed-together wooden sawhorses suffer from the disadvantage that when the work-supporting top member that runs along the top of the sawhorse has become badly cut, pitted, or scarred by virtue of tools passing entirely through the actual work and into the top member, it is at best very inconvenient to replace the top member. Generally the whole sawhorse must be disassembled and a new top piece nailed into place.

It is often difficult to use a top piece that is not fairly straight, since a crooked or twisted top section may make the whole sawhorse crooked or twisted to the extent that it does not stand firmly on the floor.

Moreover, such sawhorses are somewhat heavy to move around, and awkwardly bulky to store when not in use. Most importantly, as such a sawhorse ages, its fastening nails begin to loosen and it tends to become more and more "rickety" or unstable, confronting the user with the decision whether to build a new sawhorse, attempt to reinforce the old one, or just put up with the instability for a while longer.

Substituting metal for wood in a conventional sawhorse presents the problem of manufacturing cost, particularly because a sawhorse must be quite sturdy to be of any value at all. Carpentry often involves the carpenter's placing her or his own weight, as well as the weight of the workpiece and tools, on the sawhorse; and it is essential that the sawhorse not buckle under these loads. Use of conventional sawhorse configuration, involving a number of different-sized pieces for bracing, therefore would be quite costly in metal, and would of course—just as in wood—produce a rigid structure awkward to move and to store.

Moreover, an all-metal sawhorse would be subject to the disadvantage that tools passing all the way through the workpiece would impinge upon a metal top member, very likely to damage or at least hasten the wear on the tools. In many situations this arrangement also would invite tool slippage or rebound, damaging to the workpiece and/or hazardous to the carpenter.

BRIEF SUMMARY OF THE INVENTION

The present invention aims to provide a metallic sawhorse frame that has none of the disadvantages described above. In particular, it invites use of a very inexpensive piece of lumber or other stock—even one that is quite irregular—as a disposable work-supporting top member. Moreover, it grips the top member very forcefully and in such a way that it affirmatively resists becoming progressively more "rickety" with heavy use. Yet it permits replacement of the top member in a small fraction of a minute, at any time, on a moment's notice, and with absolutely no tools or special procedures.

It is lightweight, folds nearly flat for storage, and is extremely sturdy; and yet it is made with only three distinctly different structural forms—all three of formed sheet metal and therefore highly economical to manufacture. The different forms are so configured that they can be cut from rectangular stock with minimum wastage. Other than these three forms, the only other materials of significant cost are conventional nuts and bolts.

A preferred embodiment of my invention consists of a sawhorse frame that is for use with a "top member"—for instance, a piece of two-by-four lumber or other structural member, that is preferably inexpensive and thus disposable. The frame is for use on a supporting floor surface.

The so-called top member is to be generally horizontal when in use, and it serves the familiar function of the top member of a conventional sawhorse—namely, to directly support the workpiece of the carpenter or like craftsman who is using the sawhorse.

As with conventional sawhorses, the sawhorse frame of my invention defines generally two inclined sawhorse "faces" that are connected together near their top edges.

By the "faces" of the sawhorse I mean to refer to the familiar open shapes that are associated with the term "sawhorse," the face on each side consisting of one leg at each end and (very generally) a connecting top member or cross member. In conventional sawhorses, and also in my sawhorse when the top member is in place, the connecting top member is common to the two faces; where separate cross members are used there may be distinct cross members for the two faces rather than one that is common to them.

The foregoing paragraphs in essence describe the *context* of certain preferred embodiments of my invention; the preferred embodiments themselves are described below.

The sawhorse frame includes two "left legs"—one for use on each face of the sawhorse. The frame also includes two "right legs," one for use on each face.

Each of the legs has a foot portion at the lower end of the leg, and a hinge portion that defines a hinge-fastener hole near the upper end of the leg. That is to say, near the upper end of each leg there is a hole through which a hinge fastener may be passed. Each of the legs also has a portion, near the hinge portion, that forms a clamping jaw for receiving and engaging one side of the top member.

The left and right legs are adapted for assembly in pairs to form two inverted-V structures, one left leg and one right leg constituting one pair. This assembly is effected by passage of a hinge fastener through the hinge-fastener holes of each pair of legs—and by securing of the hinge fasteners to the said plate of legs.

By this assembly process the respective clamping jaws of paired legs, when so assembled, form pairs of clamping jaws—each pair being adapted to clamp and thereby to secure one end of the top member.

The preferred embodiment under discussion also has two hinge fasteners, as already defined, each adapted to be passed through the hinge-fastener holes of one pair of legs, and to be secured to the respective pairs of legs.

In addition the preferred embodiment has at least one cross member that is adapted to be juxtaposed and secured at one of its ends to one pair of legs, and at the other of its ends to the other pair of legs. By this arrangement the cross member supports the pairs of legs in a spaced-apart self-standing configuration. As already mentioned, I prefer to use a separate one of these cross members on each face of the sawhorse frame.

The paired legs are adapted for mutual relative rotation—when they have been assembled—about their respective hinge fastener. The overall result of this configuration is dual:

(1) When the sawhorse is in use and the legs are pressed against a supporting floor surface, the resultant force on the bottom ends of the legs (outwardly from the face of the sawhorse) is transmitted via the hinge fastener to the clamping jaws. This force is transmitted with a very large mechanical advantage, by virtue of the respective distances from the feet and jaws to the hinge fastener, creating a relatively very large inwardly directed force to clamp the top member.

(2) When the sawhorse is not in use the bottom ends of the legs may be moved close together by using the same capacity for mutual rotation, to put the sawhorse into a compact condition for storage.

I prefer to have the clamping jaws formed above the hinge portions of the respective legs. In my preferred embodiment each cross member is adapted, disposed and dimensioned so as not to engage the top member when the top member is received in the frame and secured there. That is to say, the cross member does not touch the top member; thus the top member is held in position by the clamping jaws only, not at all by the cross member.

Within the characteristics of the preferred embodiment already described, I prefer to provide certain specific features as follows.

Each of the "left legs" mentioned above should be substantially identical (to one another), and should be of unitary C-beam cross-sectional configuration. In this configuration, the closed end of the "C" is generally planar and adapted to be parallel to the sawhorse face, and it defines near the upper end of the leg two assembly-fastener holes. That is to say, there are two holes near the upper end of each leg, in the closed end of the "C," and these holes are provided for passage of assembly fasteners. The assembly fasteners are to be used for attaching the cross member or cross members along each face of the frame.

One side of the "C" of the C-beam is generally planar, but it is tapered in width. It has a relatively narrow foot portion at the lower end of the leg, and tapers to a relatively wide hinge portion near the upper end of the leg. For economical construction this taper may be a straight edge. This same side of the "C" furthermore is cut away above the hinge portion to form a support for the top member and a clamping jaw for receiving and engaging one side of the top member.

The hinge portion of the sheet-metal C-beam defines a hinge-fastener hole, for the purposes already explained.

In addition, the frame should include two formed sheet-metal right legs, one for use on each face of the sawhorse. These right legs are substantially mutually identical (that is, substantially identical to each other), and each should be of unitary C-beam configuration that is substantially a mirror image of the configuration of the left legs, already described.

The left and right legs are thus adapted for assembly in pairs to form the two inverted-V structures already mentioned, one left leg and one right leg constituting a pair. This assembly is effected by passing a hinge fastener through the hinge-fastener holes of each mirror-image pair of legs and, as before, securing the hinge fasteners to the pairs. The clamping effect already described is obtained in this way with the formed sheet-metal legs.

Further, the frame should include two sheet-metal cross members, substantially mutually identical. Each of these cross members should be of unitary open-Z cross-sectional configuration—that is, a Z-beam, but one in which the "Z" is "open" in the sense that the connecting or central member of the "Z" forms obtuse angles with the top and bottom arms of the "Z," rather than acute angles as in an ordinary letter "Z."

The connecting member of the "Z," in each of these cross members, is generally planar and is adapted to be juxtaposed at one of its ends to the closed end of the "C" shape of one of the right legs, and at the other of its ends to the closed end of the "C" shape of one of the left legs. This juxtaposition is preferably near the respective tops of the right and left legs.

The connecting member of the "Z" is further adapted to be disposed parallel to the face of the sawhorse, and the connecting member of the "Z" defines near each of the ends of the cross-members at least two assembly-fastener holes. These holes are adapted for alignment with the assembly-fastener holes in the closed ends of the "C" shapes of the legs, for the purpose of assembly as already mentioned.

The top arm of each "Z" shape is adapted to lie above (and not necessarily contacting) the top ends of one of the left legs and one of the right legs, and to project inwardly from the face of the sawhorse toward the top arm of the "Z" of the other cross member. The top arms of the two opposed Z-beams, however, do not touch each other and in fact are dimensioned so as not to engage the disposable top member when the latter is received and secured. This is accomplished by making the top arms of the Z-beams shorter than the tops of the clamping jaws—that is, shorter than the widths of the non-cut-away portions of the top ends of the C-beams that form the legs.

The bottom arm of each "Z" shape is adapted to project outwardly from the face of the sawhorse.

Completing the structure are two hinge fasteners and at least eight assembly fasteners.

My invention encompasses not only the components adapted for assembly as already described, but also the assembled frame. My invention also encompasses the frame in combination with a disposable top member. Particularly the combination may make use of a top member that is a length of lumber. Advantageously this piece of lumber is somewhat longer than the lengths of the cross members.

On the other hand, my invention also encompasses the frame in combination with a top member adapted for permanent use in lieu of a disposable top member, though this is not my most preferred embodiment.

In one preferred embodiment of my invention the hinge portion of the tapered side of the "C" shape of each leg also defines stops that are press-formed in the sheet metal, and adapted to engage the corresponding tapered side of the "C" shape of the paired leg.

Advantageously the mirror-image configurations of the paired tapered legs are such that each pair of legs can be cut from a single rectangular piece of sheet-metal stock with very little waste material.

All of the foregoing operational principles and advantages of the present invention will be more fully appreciated upon consideration of the following detailed description, with reference to the appended drawings, of which:

BRIEF DESCRIPTION OF THE DRAWINGS

FIG. 1 is a perspective view of the sawhorse-frame pieces of one preferred embodiment of my invention, assembled to form the frame. This view shows, received in the clamping jaws of the frame, a top member which may be disposable. This view shows the frame with its legs rotated apart to stand on a supporting floor and to clamp the top member.

FIG. 2 is an end elevation of the FIG. 1 embodiment, taken along the line 2—2 of FIG. 1.

FIG. 3 is an end elevation taken from the same angle as is FIG. 2, but taken from further back and thus showing the other end of the assembled frame, and showing it from the outside of the sawhorse rather than from the inside as in FIG. 2. Moreover, FIG. 3 shows the frame with its legs rotated together to form a compact configuration for storage.

FIG. 4 is an exploded perspective view similar to that of FIG. 1 but showing the pieces of the frame separately.

FIG. 5 is an enlarged elevation of part of FIG. 2, showing the details of the relationships between the clamping jaws, cross members, and top member.

FIG. 6 is a cross-sectional view, taken along line 6—6 of FIG. 4, showing the configuration of the C-beam of one of the legs near its top end, at the point where the hinge-fastener hole is defined.

FIG. 7 is a similar cross-sectional view, taken along line 7—7 of FIG. 4, showing the configuration of the same C-beam near its bottom end—i.e., near the foot.

FIG. 8 is a generalized schematic view showing how two paired legs can be cut from a single rectangular piece of sheet-metal stock with minimal wastage.

DETAILED DESCRIPTION OF THE PREFERRED EMBODIMENTS

Identical "right legs" 10 and mutually identical "left legs" 20 are assemblable in pairs to produce the two inverted-V structures 12-22, at the respective two ends of the sawhorse frame. This is accomplished by passing the hinge fasteners through the hinge-fastener holes 51H, and securing the hinge fasteners in place. By a "hinge fastener" is meant a suitable bolt 51 with mating nut 54, or equivalently a suitable rivet, or a hinge-pin with a transverse hole to accept a retaining "cotter pin," or equivalent means for fastening two legs together while permitting their relative rotation. For best stability over time I prefer to use a nut and bolt.

Thus "securing" the hinge fasteners, in this context, means completing the fastening by screwing a nut onto a bolt, or upsetting a rivet, or passing a cotter pin through a hinge-pin hole, or the like.

The two inverted-V structures or subassemblies 12-22 are then further assemblable to the cross members 30, by juxtaposing the ends of the cross members 30 to the tops of the closed ends 11, 21 of the C-beam legs 10 and 20 so that the assembly-fastener holes 52H in the C-beams are aligned with the assembly-fastener holes 36 in the cross members, then passing the eight assembly fasteners through the thus-aligned holes, and securing the assembly fasteners in place. The assembly fasteners, generally speaking, may be any of the same kinds of devices as specified above for the hinge fasteners. I prefer to use bolts 52 and mating nuts 53, which for convenience may be identical to those used as hinge fasteners.

Optional protective "shoes" 14 and 24, made of soft plastic, rubber, or the like, may be fitted to the feet of the sawhorse legs to minimize scuffing of the supporting floor.

When the frame is assembled the closed ends 11 and 21 of the C-beam legs are parallel to the "faces" of the frame. By "face" is meant the open, generally planar shape defined generally by each cross member 30 with its respective attached "left leg" 10 and "right leg" 20. One side 12 or 22 of the C-beam cross-section is tapered from a narrow foot portion 13, 23 to a broad hinge portion 15, 25. It is in the hinge portions 15 and 25 that the hinge-fastener holes 51H are defined.

Above the hinge portion 15, 25 in each leg the C-beam side 12, 22 is cut away to form a generally horizontal support surface 15T, 25T and a clamping jaw 16, 26. The opposed clamping jaws thus paired will firmly clamp the top member 41 between them, when the sawhorse legs are rotated apart at their feet as in FIGS. 1, 2 and 5.

As stated earlier, I prefer to have the clamping jaws formed above the hinge portions of the respective legs. This simplifies the mechanical arrangements for (a) applying inward force against the top member in response to outward force on the feet of the sawhorse; and for (b) loosely supporting the top member within the clamping jaws, by the force of gravity, when the sawhorse legs are moved close together for storage—so that there is no clamping force on the top member. Other embodiments are possible, however, in which the clamping jaws are not formed above the hinge portions.

The part of the C-beam side 12 or 22 that is not thus cut away forms a relatively narrow top surface 16T, 26T, angled slightly downward.

Above these top edges 16T, 26T lie the top arms 33 of the open-Z cross-section of the cross members 30. I prefer to make the top edges 16T and 26T longer than the top arms 33, so that a horizontal gap 57 is provided between the sides of the top member 41 and the top arms 33.

This last feature permits use of a warped or otherwise highly irregular piece of lumber or like stock as the top member 41—for, if the cross member as well as the two pairs of clamping jaws engaged the top member, then at the very least a three-point engagement would be involved. Such a three-point engagement could occur only if the shape of the top-member stock matched the three points of engagement defined by the frame structure, within the deformation of the frame and/or top member.

If the cross member is a straight element, as I prefer in the interests of economy to make it, then an even more stringent requirement would be imposed upon the straightness of the top member since the cross member and top member would have to match in shape, within deformation, not merely at three points but along essentially their entire lengths.

I also prefer for appearance's sake to make the top arms 33 horizontal, which leaves a small, wedge-shaped vertical gap between the top arms 33 and the top edges 16T and 26T. This latter gap is of no consequence.

The other side 19 or 29 of the "C" of each C-beam leg 10, 20 need not be tapered, but can be simply a narrow flange or lip as illustrated. In fact, if desired, this side 19, 29 can be entirely omitted, but I prefer to include it for the extra stability of shape which it provides.

As already noted the central or connecting sections 31 of the open-Z structures 30 lie generally flat against the closed ends 11 and 21 of the respective legs 10 and 20. The bottom arms 32 of the open-Z structures extend generally outward from the faces of the frame. The use of the top and bottom "Z" arms 33 and 32 angled away from the connecting member 31 of the "Z" gives the cross members far more stability in the direction normal to the faces of the frame than they would have if the cross members were entirely planar.

Even when the sawhorse legs are rotated together at their feet for storage as in FIG. 3, the support surfaces 15T and 25T in cooperation with the clamping jaws 16 and 26 will generally support and restrain the top member so that it can be stored with the frame. When the sawhorse legs are rotated apart at their feet so that the frame is self-standing, but yet are not so firmly separated as to clamp the top member between the clamping jaws, the support surfaces 15T and 25T in cooperation with the jaws 16 and 26 will support and position the top member correctly—so that when the feet are later firmly separated the clamping action will occur without any need for careful manual positioning or adjustment of the top member.

I prefer to place the hinge-fastener holes 51H approximately five-eighths of an inch below the horizontal support surfaces 15T and 25T, and to dimension these support surfaces and the clamping jaws so that a piece of "two-by-four" lumber can be used as the top member. I also prefer to extend the clamping jaws about halfway up the sides of such a piece of lumber, when in use, or about one and three-quarters inches.

From this it can be seen that the distance from the pivot formed by the hinge fastener 51 to the effective point of force application by each clamping jaw 17, 27 (which point may be taken, for purposes of discussion, as generally halfway up the jaw) is also about one and three-quarters inches. The distance from the pivot to the bottom of the foot 13, 23 is roughly twenty-six inches. Consequently a mechanical advantage of about fifteen is obtained between the feet and the jaws.

Generally the force applied to spreading the feet of the frame is derived from the weight applied to the entire sawhorse, and this will usually consist of (in addition to its own weight) the weight of the workpiece plus whatever fraction of the weight of the carpenter is applied to the workpiece and/or the sawhorse. The foot-spreading force thus derived for each foot is not equal to the applied weight, however, since (1) the applied weight is distributed among the four feet and (2) there is a sine relationship between the weight share borne by each leg, the force with which that leg is pushed outward, and the angle between that leg and the vertical.

The angle just mentioned is subject to the choice of the designer, and also varies somewhat with the thickness of the particular piece of lumber used, being greater for thinner pieces of stock. For the usual thickness of one and three-quarters inches, however, and designing the legs so that the surfaces 11, 21 stand at approximately twenty degrees (whose sine is about 0.34) to the vertical, the outward force on each foot equals, as a general proposition, one-fourth times 0.34 times the applied weight, or about 0.08 times the applied weight.

The clamping force is then this value times the mechanical advantage of about fifteen, for a total at each pair of jaws of about 1.2 times the total applied weight. It will be apparent that by applying only a quarter of her or his weight to the workpiece or sawhorse, the carpenter can cause each pair of jaws to grip the top member with a force varying from perhaps thirty pounds (for a one-hundred-pound person) to sixty pounds (for a two-hundred-pound person). When desired, of course, a greater fraction of body weight may be applied.

The top member is thus very securely held in place, so that there is virtually no problem of its slipping during a work operation. The greater the weight applied to the sawhorse, the greater the force with which the top member is clamped, and the stability of the overall structure increases with the load placed upon it.

The preferred embodiment illustrated also has the characteristic that—by virtue of the mirror-image relationship of the "left legs" 10 and "right legs" 20—both legs of each pair can be cut from a single rectangular piece of sheet metal with only minimal wastage. This is shown in FIG. 8, in which the solid lines represent cuts and the phantom lines 56 represent folds (or, to use the industrial term, "breaks") that are made in the metal after cutting. Only the small pieces 55—that are cut away to form the support surfaces 15T and 25T and the jaws 17 and 27—are unused. The cross members 30, of course, are each rectangular and so can be cut from a rectangular piece of suitable width with no wastage at all.

One further feature may be advantageously but optionally provided in the preferred embodiment illustrated. That feature consists of a stop 57 (FIG. 5) press-formed in the tapered side 22 of each right-side C-beam leg 20; and a mirror-image stop 58 press-formed in the tapered side 12 of each left-side leg 10.

The stops 57 and 58 are formed somewhat above the hinge-fastener holes 51H, and each stop 57, 58 is well *outward* (toward the face of the sawhorse) from the furthest-outward point to which the tapered edge of the *mating* side 12, 22 swings when a suitable top member 41 is in position.

Thus the stops never engage the tapered edges of the mating sides when a suitable top member 41 is in place, and as will be apparent they never engage the tapered edges when the legs are folded together for storage. The stops can engage the tapered edges of the mating sides only when there is no suitable top member 41 in place, and the legs are rotated outwardly so that the sawhorse frame can stand.

The purpose of these stops may be seen from this fact: normally the top member when in position limits the inward relative motion of the jaws 17 and 27, and thus indirectly limits the outward relative motion of the feet 13 and 23. When the top member is not in position, and absent the stops 57 and 58, there is nothing to prevent the feet of the sawhorse frame from sliding apart on a slippery floor, so that the frame collapses to the floor.

The stops 57 and 58 prevent this from occurring. I consider them optional because collapse can only occur on a quite slippery floor anyway, and users can be warned of the possibility of collapse when the frame is standing with no top member in place—a relatively unusual condition.

Preferably the sawhorse frame is formed from galvanized steel sheet approximately 0.075 inch thick.

The overall leg length is approximately twenty-eight inches, and the width of the closed end 11, 21 of each C-beam is approximately two inches. The tapered side 12, 22 of each C-beam preferably varies in width from a maximum of about three inches for the hinge portion 15, 25 to a minimum of about one-half inch at the foot. The top surface 16T, 26T is roughly five-eighths inch long. The untapered side 19, 29 of each C-beam, if provided, may be approximately one-half inch wide.

The overall cross-member 30 length is approximately thirty-six inches, the width of the connecting section 31 of each Z-beam is approximately three inches, and the widths of the generally horizontal top and bottom arms 33, 32 are approximately one-half inch each.

All the fasteners may be number $\frac{3}{8}$-16 bolt, three-quarters inch long at the shank, with mating nuts. The nuts should preferably be of the type that is fitted with internal plastic lock rings.

It is to be understood that all of the foregoing detailed descriptions are by way of example only, and not to be taken as limiting the scope of my invention—which is expressed only in the appended claims.

I claim:

1. A sawhorse frame for use with a disposable top member and comprising:

two substantially identical formed sheet-metal left legs, one for use on each face of the sawhorse, each of the left legs being of unitary C-beam cross-sectional configuration wherein:
the closed end of the C is generally planar and adapted to be parallel to the sawhorse face, and defines near the upper end of the leg two assembly-fastener holes,
one side of the C is generally planar and tapered from a relatively narrow foot portion at the lower end of the leg to a relatively wide hinge portion near the upper end of the leg, and is further cut away above the hinge portion to form a support for such top member and a clamping jaw for receiving and engaging one side of such top member, and
the hinge portion defines a hinge-fastener hole;

two substantially mutually identical formed sheet-metal right legs, one for use on each face of the sawhorse,
each of the right legs being of unitary C-beam configuration that is substantially a mirror image of the said configuration of the left legs, and
the left and right legs being adapted for assembly in pairs to form two inverted-V structures, one left leg and one right leg constituting one pair, by passing a hinge fastener through the hinge-fastener holes of each pair of legs and securing the hinge fasteners to the said pairs,
whereby the respective clamping jaws of paired legs when so assembled form pairs of clamping jaws, each pair adapted to clamp and thereby to secure one end of such disposable top member;

two substantially mutually identical formed sheet-metal cross members, each cross member being of unitary open-Z cross-sectional configuration wherein:
the connecting member of the Z is generally planar and adapted to be juxtaposed at one of its ends to the closed end of the C shape of one of the right legs and at the other of its ends to the closed end of the C shape of one of the left legs, near the respective tops of the right and left legs, and the connecting member of the Z is further adapted to be disposed parallel to the face of the sawhorse, and the connecting member of the Z defines near each of the ends of the cross members at least two assembly-fastener holes adapted for alignment with the said assembly-fastener holes in the closed ends of the C shapes of the legs,
the top arm of the Z is adapted to lie above the top ends of one of the left legs and one of the right legs, and to project inwardly from the face of the sawhorse toward the top arm of the Z of the other cross member, said top arm of the Z being dimensioned so as not to engage such disposable top member when the latter is received and secured, and
the bottom arm of the Z is adapted to project outwardly from the face of the sawhorse; and two hinge fasteners and at least eight assembly fasteners.

2. The sawhorse frame of claim 1, assembled with:
the hinge fasteners passing through respective paired hinge-fastener holes to form two inverted-V structures; and
the assembly fasteners passing through respective assembly-fastener holes defined in the legs and cross members in alignment, to interconnect the two inverted-V structures and thereby form a free-standing frame adapted to receive and clampingly secure such disposable top member.

3. The sawhorse frame of claim 2, in combination with such disposable top member.

4. The combination of claim 3, wherein the disposable top member is a length of lumber longer than the lengths of the cross members.

5. The sawhorse frame of claim 4, in combination with a top member adapted for permanent use in lieu of such disposable top member.

6. The sawhorse frame of claim 1, wherein:
the hinge portion of the said tapered one side of the C shape of each leg also defines press-formed stops adapted to engage the corresponding tapered side of the C shape of the paired leg.

7. The sawhorse frame of claim 1, wherein:
the paired legs when assembled are adapted for mutual relative rotation about their hinge fastener, whereby:
when the sawhorse is in use and the legs are pressed against a supporting floor surface the resultant force on the bottom ends of the legs outwardly from the sawhorse is transmitted with a mechanical advantage of more than ten times via the hinge fastener to the clamping jaws at the top ends of the legs, creating a large inwardly directed force to clamp the top member, and
when the sawhorse is not in use the bottom ends of the said legs may be moved close together by said mutual rotation, to put the sawhorse into a compact condition for storage.

8. The sawhorse frame of claim 1 wherein:
the said substantially mirror-image configuration of the paired tapered legs is such that each pair of legs can be cut from a single rectangular piece of sheet-metal stock with very little waste material.

* * * * *